Figure 1:
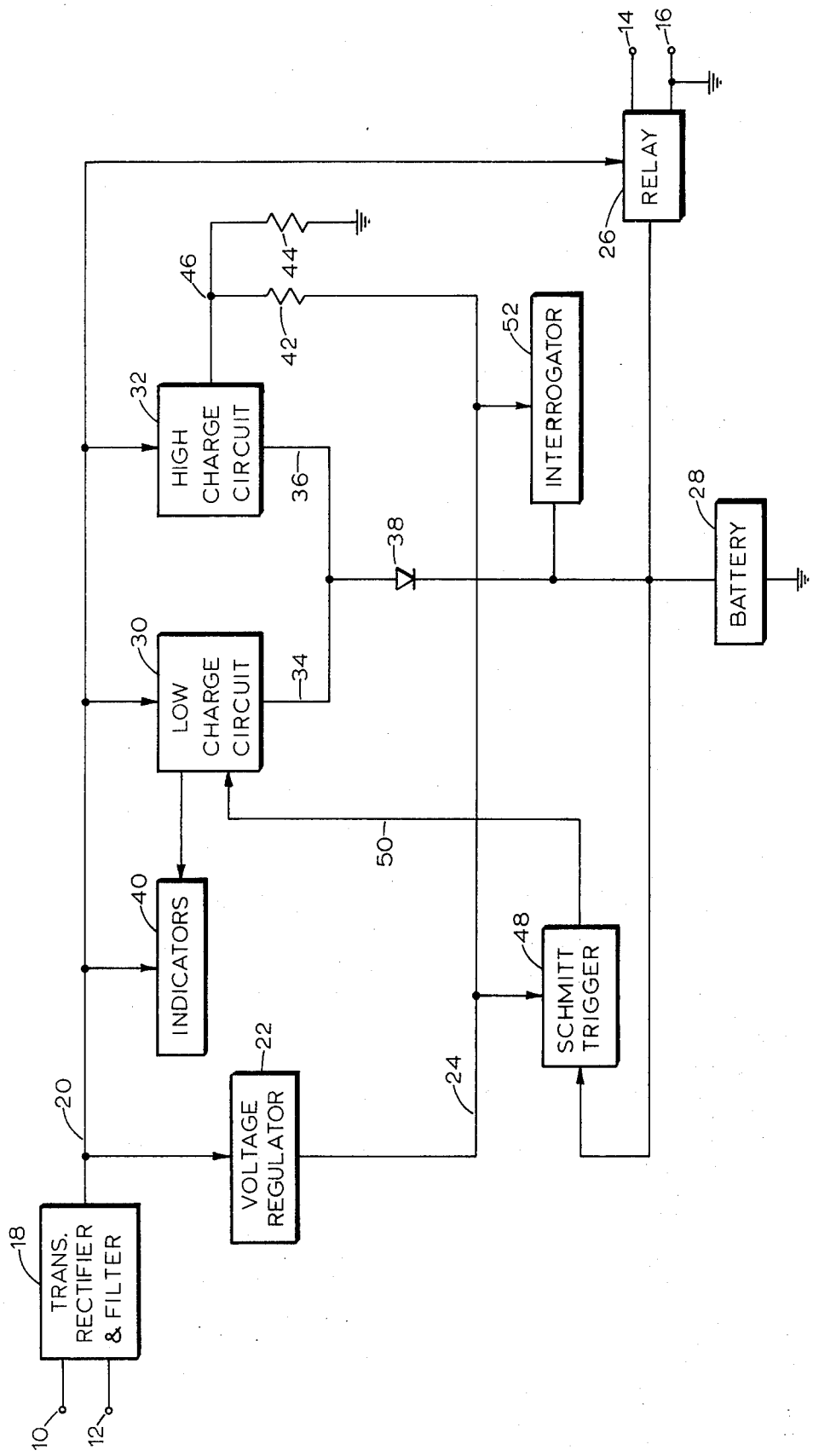

United States Patent
Beaman et al.

[11] 3,795,818
[45] Mar. 5, 1974

[54] EMERGENCY POWER SUPPLY

[75] Inventors: Don L. Beaman, Sunnyvale; John T. Shoberg, Milpitas, both of Calif.

[73] Assignee: Shetec, Inc., San Jose, Calif.

[22] Filed: Feb. 9, 1973

[21] Appl. No.: 331,068

[52] U.S. Cl. .................................. 307/66, 320/39
[51] Int. Cl. ............................................. H02j 7/00
[58] Field of Search ...... 307/66, 43, 64; 320/39, 40; 315/86, 87

[56] References Cited
UNITED STATES PATENTS
3,659,181  4/1972  Bembenek ........................... 320/39

*Primary Examiner*—Robert K. Schaefer
*Assistant Examiner*—M. Ginsburg
*Attorney, Agent, or Firm*—Andrew G. Pulles

[57] ABSTRACT

The disclosed embodiment of the present invention is an auxiliary power supply which generally includes a battery, a relay for connecting the battery to an output in the absence of line voltage, and a circuit for charging the battery. The charging circuit includes a circuit for providing a relatively low charge rate to the battery and another circuit for providing a relatively high charge rate to the battery. A Schmitt trigger circuit is responsive to the voltage level of the battery for activating and deactivating the low charge rate circuit. A gate compares the voltage level of the battery with a reference voltage level to control the high charge rate circuit. Once the high charge circuit has been rendered inoperative during a particular period between line voltage failures, it remains inoperative. An interrogator circuit periodically draws a relatively small energy current pulse from the battery, thereby placing it under a load condition while the Schmitt trigger is sensing the voltage level of the battery. If, by virtue of the load condition, the voltage level of the battery drops below one of the trigger levels of the Schmitt circuit, the trigger circuit will activate the low charge circuit to charge the battery.

15 Claims, 2 Drawing Figures

EMERGENCY POWER SUPPLY

This invention relates generally to an auxiliary power supply and more particularly to an improved charging circuit for a battery in an auxiliary power supply.

Auxiliary power supplies are employed to supply emergency power for installations where the absence of line voltage would cause undesired conditions, and in some instances cause a disaster. For example, an operating room in a hospital must remain illuminated during an operation. As a result, the majority of the better-equiped hospitals employ auxiliary power supplies as a source of power for the lighting system in the operating room during a period of line power failure. Railway signals and municipal fire alarm systems are other examples in which some form of electrical power must be made available during an electrical power failure. Other examples include burgler alarm systems and telephone exchanges, both of which must remain active during a power failure.

Telephone exchanges also require the use of stationary batteries, such as found in auxiliary power supplies, for another purpose. The use of stationary batteries in a telephone exchange prevents cross-talk between different telephone circuits. If a common power supply is employed, it is difficult to prevent one telephone conversation from being transferred to all other telephone circuits in the exchange through the common supply.

In each of these and in other situations where a stationary battery is required, there is a need for a system to automatically maintain the charge of the battery at a particular level so that sufficient power will be available when the line voltage fails. The charge of a battery will be reduced in the absence of any charge supplied thereto over a period of time. Stationary batteries have a self-discharge rate and, accordingly, must be periodically recharged or continuously trickle charged to maintain a desired charge level. The self-discharge rate of a particular battery is dependent upon a number of factors and usually differs from one battery to another. The temperature of the battery greatly affects its self-discharge rate, with an increase in temperature causing an increase in the self-discharge rate. The shelf life of a battery also affects its self-discharge rate. Furthermore, batteries may be susceptible to losing their charge through leakages. Accordingly, it can be readily appreciated that the rate of charge loss of a particular battery cannot be accurately determined.

It has been the principle practice in the past to supply, at a relatively low rate, a continuous charge, called a trickle charge, into the battery to offset the charge loss therefrom. This technique requires that the charging rate supplied to the battery be equal to the rate of charge loss from the battery. Unfortunately, the rate of charge loss from the battery, as mentioned above, cannot be accurately determined, since it varies from one battery to another and in accordance with certain variable factors. Since it is essential that the battery charge remain at a relatively high level so that it will be available to supply the necessary power upon demand, it has been the practice to overestimate the rate of charge loss from a battery and, consequently, the charge to be supplied thereto. Furthermore, since the rate of charge loss varies from one battery to another, it has been necessary in the practice of this technique to select a charging rate which corresponds to the highest rate of charge loss which will be encountered in a particular system and for any battery employed therein. This method of determining the charging rate supplied to the battery, whether continuously or periodically, suffers from certain distinct disadvantages.

It can be readily appreciated from the above discussion that only on rare occurrences will the selected charging rate be equal to the rate of charge loss from the battery. If the charging rate is selected so that it is never less than the rate of charge loss, then a condition exists in which energy is supplied to the battery which does not add to its charge. Any such energy supplied to a battery which does not add to its charge will be converted into heat and electrolysis. When energy is consumed in the form of electrolysis, hydrogen and oxygen in gas form are produced and escape from the electrolyte solution. This condition, which is called "outgassing", not only causes corrosion of the battery structure, but also has a corrosive affect on structures in the surrounding environment. Furthermore, the production and resultant loss of hydrogen and oxygen depletes the water from the electrolyte solution. As a result of this loss, water must be periodically supplied to the battery, thereby increasing the maintenance and service costs associated with such systems.

The actual charge of a battery is measured in the amount of current the battery can deliver over a predetermined time period. For example, if a battery can deliver five amperes for a period of twenty hours, it is rated as a 100 ampere-hour battery.

However, there is no means available for measuring the charge of a battery directly in units of ampere-hours or, more specifically, in the amount of current which the battery can deliver over a predetermined period of time, without fully discharging the battery while measuring such quantities. Accordingly, such a measure of the charge level of a battery must be made by other means or techniques. One such technique involves measuring the specific gravity of the electrolyte in a lead-acid storage battery. However, this technique is not susceptible of implementation with automatic detection means and without human intervention.

Since stationary batteries are designed to maintain a relatively high and substantially constant voltage level after a relatively long current discharge, it is not possible to accurately measure the charge of a battery by sensing its voltage level under no load conditions. A particular battery may have reached a near discharged condition while its voltage level remains relatively high without any load applied thereto. Accordingly, a charging circuit which is responsive to the voltage level of the battery under no load conditions cannot determine the actual charge level of the battery. As a result, such a battery will not be available to supply the required power when a line power failure occurs.

Accordingly, it is a primary object of the present invention to provide a charging circuit for the battery in an auxiliary power supply which is capable of sensing the actual charge condition of the battery.

Another object of the present invention is to provide a charging circuit for the battery in an auxiliary power supply which will maintain the battery at a relatively high charge level so that it will be available to provide the required amount of power at all times in the event of a line voltage failure.

A further object of the present invention is to provide a charging circuit for the battery in an auxiliary power supply which is controlled to supply no more energy thereto than that required to sustain the charge of the battery at a particular level. These and other objects of the present invention are attained by the provision of means for sensing the charge condition of the battery by placing it under load and simultaneously sensing its voltage level.

A feature of the present invention resides in the provision of an interrogator circuit for periodically interrogating the battery so that its charge condition can be more acurately determined.

A further feature of the present invention resides in the provision of means for periodically drawing a small energy current pulse from the battery to place it under a load condition and means for sensing the voltage level of the battery under such a load condition.

More specifically, the disclosed embodiment of the present invention employs an oscillator for periodically loading the battery, a Schmitt trigger connected to the battery and providing an output when its voltage drops to a predetermined level, and a switching circuit operable in response to the Schmitt trigger output to supply a charging current to the battery. This arrangement insures that the battery will not be charged when its charge condition is high enough to cause its terminal voltage to remain high under a loaded condition. As a result, the disadvantages of the prior mentioned techniques are overcome.

Figure 2:
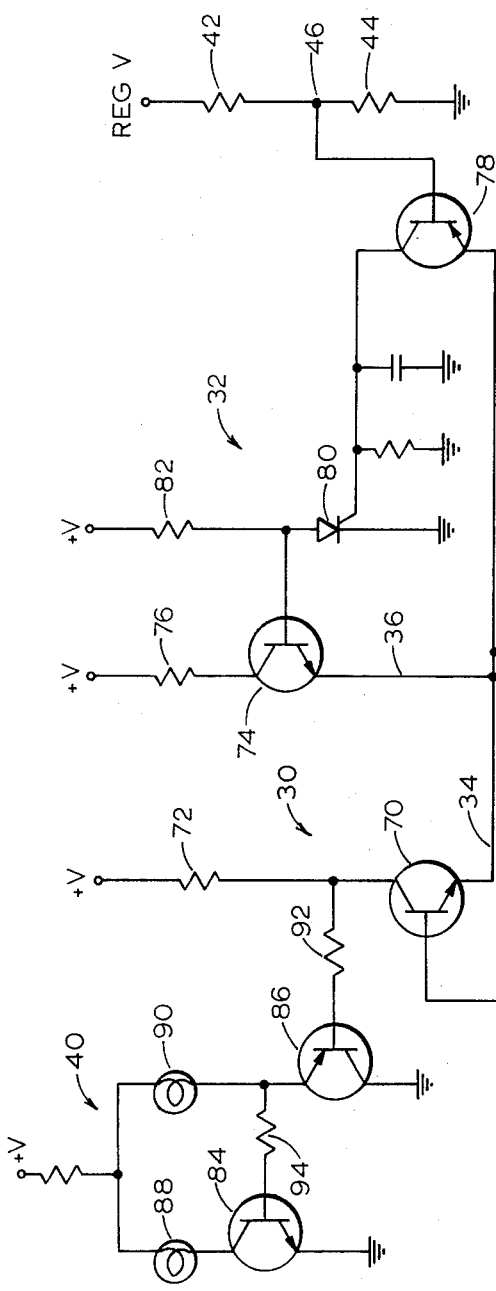
Figure 2:
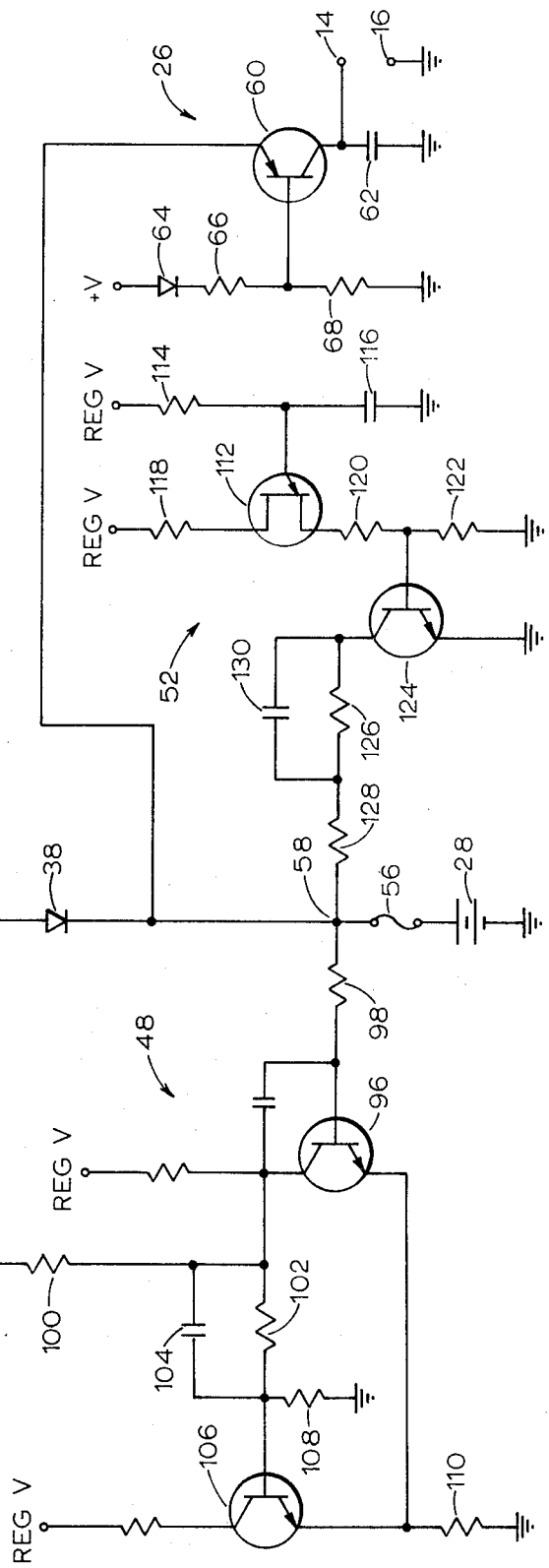

The invention, however, as well as other objects, features and advantages thereof will be more fully realized and understood from the following detailed description, when taken in conjunction with the accompanying drawings, wherein:

FIG. 1 is a block diagram of an auxiliary power supply constructed in accordance with the principles of the present invention; and FIG. 2 is a schematic diagram of a portion of the system illustrated in FIG. 1.

With reference to FIG. 1, there is shown an auxiliary power supply constructed in accordance with the principles of the present invention which is connected to a source of line voltage on a pair of terminals 10 and 12 and supplies an output on a pair of terminals 14 and 16. Whenever the line voltage on the terminals 10 and 12 fails, power is supplied across the terminals 14 and 16 which are disposed for connection to an output device, such as a lighting system.

The line voltage on the terminals 10 and 12 is connected through a transformer, rectifier and filter circuit 18 to supply unregulated direct current voltage at an output thereof on a line 20. A voltage regulator 22 which is connected to the line 20 supplies regulated direct current voltage at its output on a line 24. When the line voltage on the terminals 10 and 12 fails, no voltage will be supplied to the line 20. A relay 26 closes a circuit between a battery 28 and the terminals 14 and 16 in response to the absence of voltage on the line 20.

In order to assure that the battery 28 will be available to supply sufficient power to the terminals 14 and 16 when a power line failure occurs, the battery must be maintained in a charged condition at all times. The battery 28 can be charged through either a low rate charge circuit 30 or a high rate charge circuit 32 which are both responsive to control signals to connect the voltage on the line 20 through associated impedances or current limiting elements to output lines 34 and 36, respectively. The lines 34 and 36 are connected through a diode 38 to the positive terminal of the battery 28.

The low rate charge circuit 30 is connected to indicators 40 which provide an indication of the charging state of the circuit 30.

The regulated voltage on the line 24 is connected through a voltage divider circuit, formed of resistors 42 and 44 connected in a series, to ground potential to provide a reference voltage at a circuit point 46. The reference voltage at the circuit point 46 is connected to the high rate charge circuit 32 which compares that voltage with the voltage on the line 36 to control the charge supplied therethrough to the battery 28.

A Schmitt trigger circuit 48 is responsive to the voltage level of the battery 28 and supplies an appropriate control signal on an output line 50 to control the low charge circuit 30. An interrogator circuit 52 periodically interogates the battery 28 by drawing a relatively high current pulse of short duration therefrom to effectively place the battery 28 under a load condition. During the time that the battery 28 is placed under the load condition by the interrogator 52, the Schmitt trigger 48 is operative to sense its voltage level. If the load condition on the battery 28 causes its voltage level to drop below the trigger level of the Schmitt trigger circuit 48, it will provide an appropriate control signal on the line 50 to energize the low rate charge circuit 30.

Since the Schmitt trigger circuit 48 and the interrogator circuit 52 are provided with power from the line 24, the battery 28 will, with the exception of its connection through the relay 26, not be under any load condition during a line voltage failure. More particularly, during a line voltage failure the interrogator 52 will not be operative to draw a current pulse from the battery 28 due to the lack of voltage on the line 24. The particulars of auxiliary power supply illustrated in FIG. 1 will, however, be more fully understood from the description of FIG. 2 hereinbelow.

As shown in FIG. 2, the battery 28 is connected in series with a fuse 56 between a circuit point 58 and ground potential. The circuit point 58 is connected through the relay 26 to the terminal 14. The relay 26 includes a transistor 60 having its emitter connected to the circuit point 58 and its collector connected to the terminal 14 and through a capacitor 62 to ground potential. The direct current voltage on the line 20 is connected through a diode 64 and a pair of resistors 66 and 68 to ground potential. The base of the transistor 60 is connected to the junction between the resistors 66 and 68 which form a voltage divider circuit. When the line voltage fails, the voltage on the line 20 drops to ground potential, thereby forward biasing the transistor 60 and permitting current flow therethrough from the battery 28 to the terminal 14.

Through various factors, the charge of the battery diminishes over a period of time unless it is recharged. The charging circuits 30 and 32 provide such a recharge for the battery 28 to maintain its charge level above a predetermined value at all times. The low charge circuit 30 includes a transistor 70 having its collector connected through a resistor 72 to the voltage on line 20. The emitter of the transistor 70 is connected through the diode 38 to the positive side of the battery 28. The high charge circuit 32 includes a transistor 74 having its collector connected through a resistor 76 to the voltage on line 20. The emitter of the transistor 74 is connected through the diode 38 to the positive side of the battery 28. The value of the resistor 72 is selected such that when the transistor 70 is conductive, a relatively small current is supplied to the battery 28. The value of the resistor 76 is selected such that when the transistor 74 is conductive a relatively high current is supplied to the battery 28.

The conduction of the transistor 74 is controlled by a circuit which includes a transistor 78 having its emitter maintained at the voltage level of the battery 28 by virtue of its connection to the anode of the diode 38. The base of the transistor 78 is connected to the circuit point 46. Accordingly, when the voltage on the emitter of the transistor 78 is less than the voltage at the circuit point 46, the transistor 78 is non-conductive.

The collector of the transistor 78 is connected to the gate of a silicon controlled rectifier (SCR) 80 which is connected in series with a resistor 82 between the voltage on the line 20 and ground potential. The base of the transistor 74 is connected to the anode of the SCR 80. Accordingly, when the SCR 80 is non-conductive, the transistor 74 will be rendered conductive, thereby supplying a charging current to the battery 28. When the voltvoltage level of the battery 28 attains a predetermined value, the transistor 78 will be rendered conductive thereby placing a positive voltage on the gate electrode of the SCR 80. As a result of the conduction of the transistor 78, the SCR 80 becomes conductive and the bias is removed from the transistor 74 rendering it non-conductive.

Once the SCR 80 becomes conductive, it remains in that state until the voltage on the line 20 reduces to near ground potential. Accordingly, the battery 28 will receive a high charge from the circuit 32 only once during any period between power line failures or if the line voltage is removed for any reason. In an example of this invention, the voltage at circuit point 46 was established at 14.2 volts with an approximate range of from 12.6 volts to 14.4 volts at the circuit point 58.

The indicator circuit 40 includes a pair of transistors 84 and 86 connected in series with indicator lamps 88 and 90, respectively. The base of the transistor 86 is connected through a resistor 92 to the collector of the transistor 70, such that the transistor 86 is rendered conductive to illuminate the lamp 90 whenever the transistor 70 is conductive. The base of the transistor 84 is connected to the emitter of the transistor 86 through a resistor 94 such that the transistor 84 is rendered conductive whenever the transistor 86 is non-conductive. Conduction of the transistor 86 causes the lamp 90 to illuminate indicating that the low charge circuit 30 is providing a charging current to the battery 28. When the transistor 70 is rendered non-conductive to remove the charging current from the battery 28, the transistor 86 is also rendered non-conductive and the transistor 84 is rendered conductive to cause the lamp 88 to illuminate to indicate that the battery 28 is not receiving a charging current from the low charge circuit 30.

The conduction of the transistor 70 in the low charge circuit 30 is controlled by an output of the Schmitt trigger circuit 48. The Schmitt trigger circuit 48 includes a transistor 96 having its base connected to the positive side of the battery 28 through a resistor 98. The collector of the transistor 96 is connected through a resistor 100 to the base of the transistor 70 and through a resistor 102 and a capacitor 104 in parallel with one another to the base of a transistor 106. The base of the transistor 106 is also connected through a resistor 108 to ground potential. The emitters of the transistors 96 and 106 are connected to one another and through a resistor 110 to ground potential.

When the voltage level of the battery 28 is at a relatively low value, the transistor 96 is non-conductive, thereby applying a control signal to the transistor 70 to render it conductive. Because of the voltage level of the emitters of the transistors 96 and 106 when the transistor 96 is non-conductive, the voltage at the circuit point 58 must raise to a predetermined value before the transistor 96 will be rendered conductive. Conduction of the transistor 96 causes the transistor 106 to be rendered non-conductive, thereby lowering the voltage level at the emitter thereof. Accordingly, the transistor 96 is rendered conductive at one level and non-conductive at a lower level of voltage at the circuit point 58. In a typical example, the transistor 96 is rendered conductive when the circuit point 58 attains a level of 14.4 volts and is rendered non-conductive when the voltage at the circuit point 58 reduces to 12.6 volts. Accordingly, in such an example, when the voltage of the battery 28 is equal to or less than 12.6 volts, the charging circuit 30 will supply a charging current thereto until the voltage of the battery 28 raises above 14.4 volts.

In the preferred embodiment of this invention, the interrogator circuit 52 includes an oscillator having a unijunction transistor 112. The base of the transistor 112 is connected through resistor 114 to the regulated voltage on line 24 and through a capacitor 116 to ground potential. The capacitor 116 charges through the resistor 114 until it attains a particular voltage level corresponding to the trigger level of the transistor 112. The transistor 112 is connected through a resistor 118 to the regulated voltage on the line 24 and through a pair of resistors 120 and 122 to ground potential. When the transistor 112 triggers, the charge is removed from the capacitor 116 and a positive voltage is developed across the resistors 120 and 122. The junction of the resistors 120 and 122 is connected to the base of a transistor 124 which is rendered conductive whenever the transistor 112 triggers. In a typical example, the parameters of the oscillator can be selected to provide a voltage pulse at the base of the transistor 124 once every 15 seconds.

The emitter of the transistor 124 is connected to ground potential and the collector thereof is connected through a pair of resistors 126 and 128 to the positve side of the battery 28. A capacitor is connected in parallel with the resistor 126 and forms a parallel time constant circuit therewith and a series time constant circuit with the resistor 128.

When the transistor 124 is rendered conductive, a current path is established from the positive side of the battery 28 through the resistor 128, the capacitor 130 and the transistor 124 to ground potential. The time constant of the resistor 128 and the capacitor 130 are such that a relatively short duration current pulse is drawn from the battery 28. In a typical example, the RC time constant of the resistor 128 and capacitor 130 is approximately 3 milliseconds and the RC time constant of the resistor 126 and the capacitor 130 is approximately 5 seconds. When the transistor 124 is rendered non-conductive, the capacitor 130 discharges through the resistor 126.

The short duration current pulse which is drawn from the battery 28 effectively loads the battery 28. If the charge of the battery 28 is reduced from its maximum, the voltage level thereof may drop sufficiently to trigger the Schmitt trigger circuit 48, thereby energizing the low charge circuit 30. In the above given example, if the current pulse drawn from the battery 28 reduces its voltage to less than 12.6 volts, the Schmitt trigger circuit 48 will provide the proper bias to the transistor 70 to render it conductive which will, in turn, supply a charging current to the battery 28. As previously mentioned, once the Schmitt trigger circuit 48 is triggered to cause transistor 70 to conduct, it will remain in that state until the input thereto raises to 14.4 volts.

In a typical example of this invention, the maximum amplitude of the current pulse was approximately 4 amperes. This amount of current having a decay time established by the RC time constant of the circuit loads the battery sufficiently for its terminal voltage to drop if its charge level is reduced, but does not remove any significant amount of energy therefrom. In the above example, the charge of the battery would reduce only about 5 percent over a 6 month period in the absence of any charge being supplied thereto.

If the resistor 126 and capacitor 130 are removed from the circuit and the resistor 128 is connected directly to the collector of the transistor 124, the circuit would operate properly. In such a configuration, a rectangular pulse of current would be produced. The capacitor 130, therefore, permits a smaller amount of energy to be withdrawn from the battery 28 with the same maximum amplitude of current or loading effect. Furthermore, the capacitor 130 provides protection to the battery in the event of a failure of transistor 124. Accordingly, it can be appreciated that this and other changes can be made in the invention without departing from the scope of the appended claims.

The invention claimed is:

1. In an auxiliary power supply for connecting a battery to an output in the absence of line voltage, a circuit for charging the battery comprising
   a. a source of charging voltage,
   b. means for connecting said source to the battery,
   c. means for sensing the voltage level of the battery and energizing said connecting means in response thereto, and
   d. means for loading the battery for a relatively short time duration during the presence of said line voltage, whereby said sensing means is operative to sense the voltage level of the battery under a loaded condition.

2. A circuit for charging the battery in an auxiliary power supply as defined in claim 1, further comprising means for periodically energizing said loading means.

3. A circuit for charging the battery in an auxiliary power supply as defined in claim 1, wherein said loading means includes means for drawing a pulse of current from the battery.

4. A circuit for charging the battery in an auxiliary power supply as defined in claim 3, wherein said loading means further includes a switching element connecting said current drawing means across said battery.

5. A circuit for charging the battery in an auxiliary power supply as defined in claim 4, further comprising means for periodically energizing said switching element.

6. A circuit for charging the battery in an auxiliary power supply as defined in claim 5, wherein said current drawing means includes a resistor and capacitor connected in series with one another and with said switching element.

7. A circuit for charging the battery in an auxiliary power supply as defined in claim 5, wherein said energizing means includes an oscillator.

8. A circuit for charging the battery in an auxiliary power supply as defined in claim 1, wherein said sensing means includes a trigger circuit responsive to one voltage level for switching from a first output state to a second output state and responsive to another voltage level for switching from the second to the first output state, means responsive to one output state of said trigger circuit for connecting said charging source across the battery and responsive to the other output state of said trigger circuit for disconnecting said charging source from the battery.

9. A circuit for charging the battery in an auxiliary power supply as defined in claim 8, wherein said loading means includes means for drawing a current pulse from the battery and means for periodically energizing said current drawing means.

10. A circuit for charging the battery in an auxiliary power supply as defined in claim 9, wherein said current drawing means includes a first resistor and a capacitor connected in series with one another, a second resistor connected in parallel with said capacitor, and a switching element connecting the series connected first resistor and capacitor across the battery, and wherein said energizing means includes means for producing a pulse output having a predetermined period for periodically energizing said switching element, the time constant of said second resistor and said capacitor being less than the period of said pulse output and being greater than the time constant of said first resistor and said capacitor.

11. A circuit for charging the battery in an auxiliary power supply as defined in claim 1, wherein said connecting means includes a high charge rate circuit for connecting said source of charging voltage to the battery.

12. A circuit for charging the battery in an auxiliary power supply as defined in claim 11, further comprising means connected to said high charge rate circuit for comparing the voltage level of the battery with a reference voltage and for controlling said high rate circuit in accordance therewith.

13. A circuit for charging the battery in an auxiliary power supply as defined in claim 12, further comprising means for disabling said high charge rate circuit after the voltage of the battery attains a predetermined value.

14. A circuit for charging the battery in an auxiliary power supply as defined in claim 1, wherein said connecting means includes a first impedance element connectable between said source and the battery, and a high charge rate circuit including a second impedance element connectable between said source and the battery and having a value of impedance less than the impedance value of said first impedance element, said high charge rate circuit including a switching element connecting said second impedance element between said source and the battery in one state thereof, said means for sensing the voltage level of the battery providing a control signal when voltage of the battery is less than a predetermined value, said switching element being responsive to said control signal for changing to said one state thereof.

15. A circuit for charging the battery in an auxiliary power supply as defined in claim 14, further comprising memory means connecting said control signal to said switching element, said memory means including means for disabling said high charge circuit after the voltage of the battery attains a certain value higher than said predetermined value.

* * * * *